(12) United States Patent
Michaelis et al.

(10) Patent No.: US 8,484,034 B2
(45) Date of Patent: Jul. 9, 2013

(54) ARRANGEMENT FOR CREATING AND USING A PHONETIC-ALPHABET REPRESENTATION OF A NAME OF A PARTY TO A CALL

(75) Inventors: Paul Roller Michaelis, Louisville, CO (US); David Mohler, Arvada, CO (US); Charles Wrobel, Duvall, CO (US)

(73) Assignee: Avaya Inc., Basking Ridge, NJ (US)

( * ) Notice: Subject to any disclaimer, the term of this patent is extended or adjusted under 35 U.S.C. 154(b) by 895 days.

(21) Appl. No.: 12/058,875

(22) Filed: Mar. 31, 2008

(65) Prior Publication Data

US 2009/0248421 A1   Oct. 1, 2009

(51) Int. Cl.
*G10L 21/06* (2006.01)

(52) U.S. Cl.
USPC ........ 704/276; 704/7; 704/8; 704/9; 704/220; 704/235

(58) Field of Classification Search
None
See application file for complete search history.

(56) References Cited

U.S. PATENT DOCUMENTS

| | | | |
|---|---|---|---|
| 5,724,481 A * | 3/1998 | Garberg et al. | 704/243 |
| 5,912,949 A * | 6/1999 | Chan et al. | 379/88.03 |
| 5,933,804 A | 8/1999 | Huang et al. | |
| 6,095,418 A * | 8/2000 | Swartz et al. | 235/462.01 |
| 6,940,951 B2 * | 9/2005 | Mahoney | 379/88.03 |
| 2002/0143548 A1* | 10/2002 | Korall et al. | 704/270 |
| 2002/0196914 A1 | 12/2002 | Ruckart | |
| 2003/0055981 A1 | 3/2003 | Requena et al. | |
| 2004/0032941 A1* | 2/2004 | Graham et al. | 379/219 |
| 2004/0223594 A1 | 11/2004 | Bossemeyer, Jr. et al. | |

FOREIGN PATENT DOCUMENTS

| | | |
|---|---|---|
| EP | 0973309 A2 | 1/2000 |
| EP | 1347622 A1 | 9/2003 |
| EP | 1392039 A1 | 2/2004 |
| WO | 98/45834 A1 | 10/1998 |
| WO | 00/18083 A1 | 3/2000 |

OTHER PUBLICATIONS

WebSphere Voice Toolkit 6.0.x Pronunciation Lexicon Markup Language, 5 pp., IBM, Boulder, Colorado.
Official Action for European Patent Application No. 08252856.3, mailed Mar. 10, 2010.
European Search Report and Opinion for European Patent Application No. 08252856.3, mailed Aug. 11, 2009.

(Continued)

*Primary Examiner* — Leonard Saint Cyr
(74) *Attorney, Agent, or Firm* — Sheridan Ross P.C.

(57) ABSTRACT

A first party creates and edits a phonetic-alphabet representation of its name. The phonetic representation is conveyed to a second party as "caller-identification" information by messages that set up a call between the parties. The phonetic representation of the name is displayed to the second party, converted to speech, and/or converted to an alphabet of a language of the second party and then displayed to the second party.

26 Claims, 5 Drawing Sheets

OTHER PUBLICATIONS

Baggia, et al., "Achieving Perfect TTS Intelligibility," TMCNET online,URL:http://www.tmcnet.com/channels/speech-recognition-and-text-to-speech-technology/articles/3301-achieving-perfect-tts-intelligibility.htm#>, [Retrieved on Jul. 30, 2009].

Walker, et al., "A New W3C Markup Standard for Text-To-Speech Synthesis," 2001 IEEE International Conference on Acoustics, Speech, and Signal Processing. Proceedings. (ICASSP), Salt Lake City, Utah, US, May 7-11, 2001, vol. 2, May 7, 2001, pp. 965-968.

Official Action for European Patent Application No. 08252856.3, mailed Sep. 17, 2010.

Official Action with English translation for Korean Patent Application No. 2008-0134640, dated Jun. 20, 2011 6 pages.

Official Action with English translation for China Patent Application No. 200810169090.1, dated Oct. 25, 2011 10 pages.

Official Action with English translation for China Patent Application No. 200810169090.1, dated Apr. 26, 2012 6 pages.

Official Action (with English translation) for China Patent Application No. 200810169090.1, dated Nov. 27, 2012 9 pages.

* cited by examiner

| I.P.A. ALPHABET FOR ENGLISH | | | | | | | | |
|---|---|---|---|---|---|---|---|---|
| ɑ<br>ɑmz<br>alms | ɒ<br>ɒd<br>odd | æ<br>ænd<br>and | ʌ<br>ʌp<br>up | b<br>bæt<br>bat | č<br>čɪn<br>chin | d<br>dɪn<br>din | ð<br>ðe<br>they | e<br>ep<br>ape | ɛ<br>ɛg<br>egg |
| ɝ<br>ɝθ<br>earth | ɝ'<br>ɝ'θ<br>earth | ə<br>əwɛə<br>aware | ə'<br>ə'wɛə'<br>aware | f<br>fæn<br>fan | g<br>gɛt<br>gate | h<br>hæt<br>hat | i<br>it<br>eat | I<br>ɪt<br>it | j<br>jist<br>yeast |
| ǰ<br>ǰɔ<br>jaw | k<br>kɪn<br>kin | l<br>lɔ<br>law | m<br>mun<br>moon | n<br>not<br>note | ŋ<br>sʌŋ<br>sung | o<br>old<br>old | ɔ<br>ɔl<br>all | p<br>pip<br>peep | r<br>rʌn<br>run |
| s<br>si<br>sea | š<br>ši<br>she | t<br>tɪn<br>tin | θ<br>θɪn<br>thin | u<br>uz<br>ooze | ʊ<br>bʊk<br>book | v<br>vɛst<br>vest | w<br>wʊd<br>wood | z<br>zɪp<br>zip | ž<br>'vɪžən<br>vision |
| RECEIVED PRONUNCIATION | | GENERAL AMERICAN | | | | COMMON PRONUNCIATION | | | |

ARRANGEMENT FOR CREATING AND USING A PHONETIC-ALPHABET REPRESENTATION OF A NAME OF A PARTY TO A CALL

TECHNICAL FIELD

This invention relates to telecommunications.

BACKGROUND OF THE INVENTION

In telecommunications systems, caller-identification information that is provided to the called party usually includes the spelling (i.e., a textual representation) of the calling party's name. For many names, it can be difficult to determine how the name is pronounced from the spelling. A complicating factor is that names that are spelled the same are not always pronounced the same, even in the same language. This can create numerous problems. For example, in a business environment, this can result in a customer-service agent mispronouncing a customer's name, which is embarrassing to the business and off-putting to the customer. Or, in the international telecommunications environment, attempts by receiving systems to display a calling party's name in the writing script (alphabet) of the language of the called party that is different from the writing script in which the caller-identification information is expressed are likely to be unsuccessful. Furthermore, providing of the caller-identification information to the calling party in spoken form via text-to-speech conversion often results in mispronunciation of the calling party's name. The ability to provide caller-identification information by voice to visually-impaired users is required by the USA Code of Federal Regulations part 36, section 1194, 23(e) (36 CFR §1194.23(e)). Mispronouncing the calling party's name is arguably not fully compliant with this requirement.

SUMMARY OF THE INVENTION

According to an aspect of the invention, information identifying a first party to a call (e.g., caller-identification information such as the party's name) is made available to a second party to the call in a phonetic-alphabet form. The phonetic-alphabet form of the information is advantageously created by the first party itself to ensure that the phonetic-alphabet form is to the first party's satisfaction. For this purpose, a template and a procedure for creating the phonetic-alphabet form of the information is provided to the first party. The phonetic-alphabet form of the information is then provided— e.g., displayed and/or spoken (via a text-to-speech function)—to the second party. Further advantageously, the phonetic-alphabet form of the information may be used to convert the information from a native script of the first party (e.g., Latin, Roman) to a different native script of the second party (e.g., Cyrillic, Arabic, Chinese, Japanese, etc.). Illustratively, the information in the phonetic-alphabet form is conveyed from the first party to the second party via messages of a signaling protocol that is used to set up the call between the parties, with the benefit that conveyance of the information can be affected through, yet transparently to, the communications network through which the call is made.

The invention may be implemented both as a method and an apparatus, as well as a computer-readable medium containing instructions that, when executed by a computer, cause the computer to perform the method.

DETAILED DESCRIPTION

Figure 1:
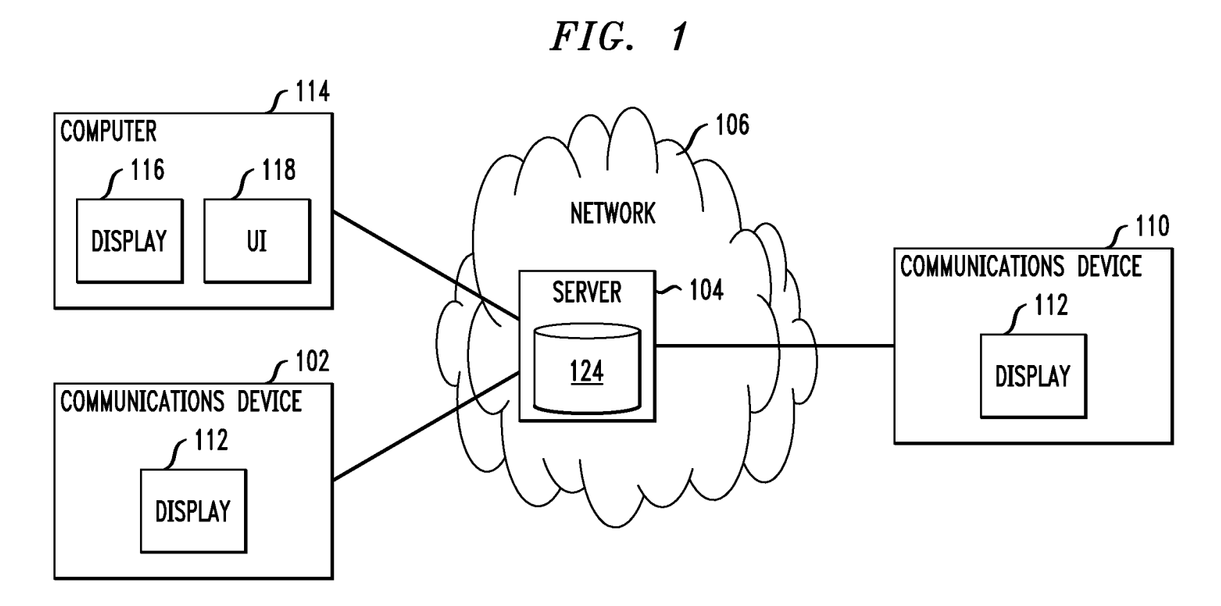
FIG. 1 is a block diagram of a telecommunications system that includes an illustrative embodiment of the invention.

FIG. 1 shows a communications system 100 comprising two or more communication devices 102, 110 interconnected by at least one communications network 106. Each device 102, 110 has a display screen 112. Within network 100, devices 102, 110 connect to, and are served by, a server 104. Alternatively, each device 102, 110 may be served by a different server of network 106. Server 104 also connects a computer 124 to communication device 102, in a conventional manner. Communications system 100 may be any desired communications system. By way of example only, network 106 comprises a private or the public service telephone network, server 104 comprises a telephone switch such as a private branch exchange or a telephone central office, and communication devices 102, 100 comprise wired or wireless telephones. In an alternative embodiment, network 106 comprises a data network such as the Internet or a local area network, server 104 comprises a communications server such as a proxy, a communications manager, or a Voice over Internet Protocol (VoIP) private branch exchange, and communication devices 102, 110 comprise any desired devices such as wired or wireless VoIP telephones, personal digital assistants, personal computers, etc. The type and structure of the system 100 or any of its components is immaterial. As described so far, system 100 is conventional.

Figure 2:
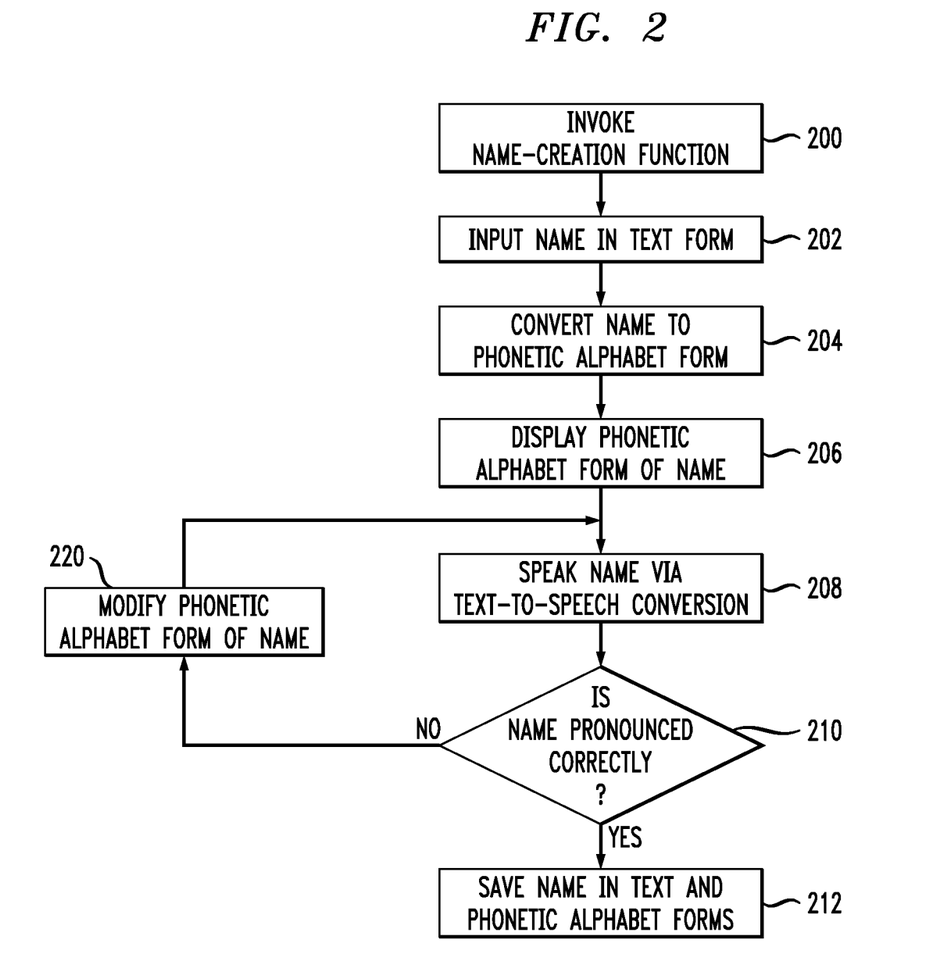
FIG. 2 is a flowchart of a process of creating a phonetic-alphabet representation of a name in the system of FIG. 1.

According to an aspect of the invention, computer 114 is used to create a phonetic-alphabet representation of the name of a user of communication device 102 for use by communication device 102 in communicating with other devices such as communication device 110. Computer 114 is illustratively either an administrative terminal of server 104 or a personal computer of a user of device 102. Alternatively, if communication device 102 has sufficient computer-like capabilities and user interfaces to accomplish the task, the phonetic-alphabet representation of the name may be created directly on device 102. The process of creating the phonetic-alphabet representation of a name is shown in FIG. 2.

Figure 3:
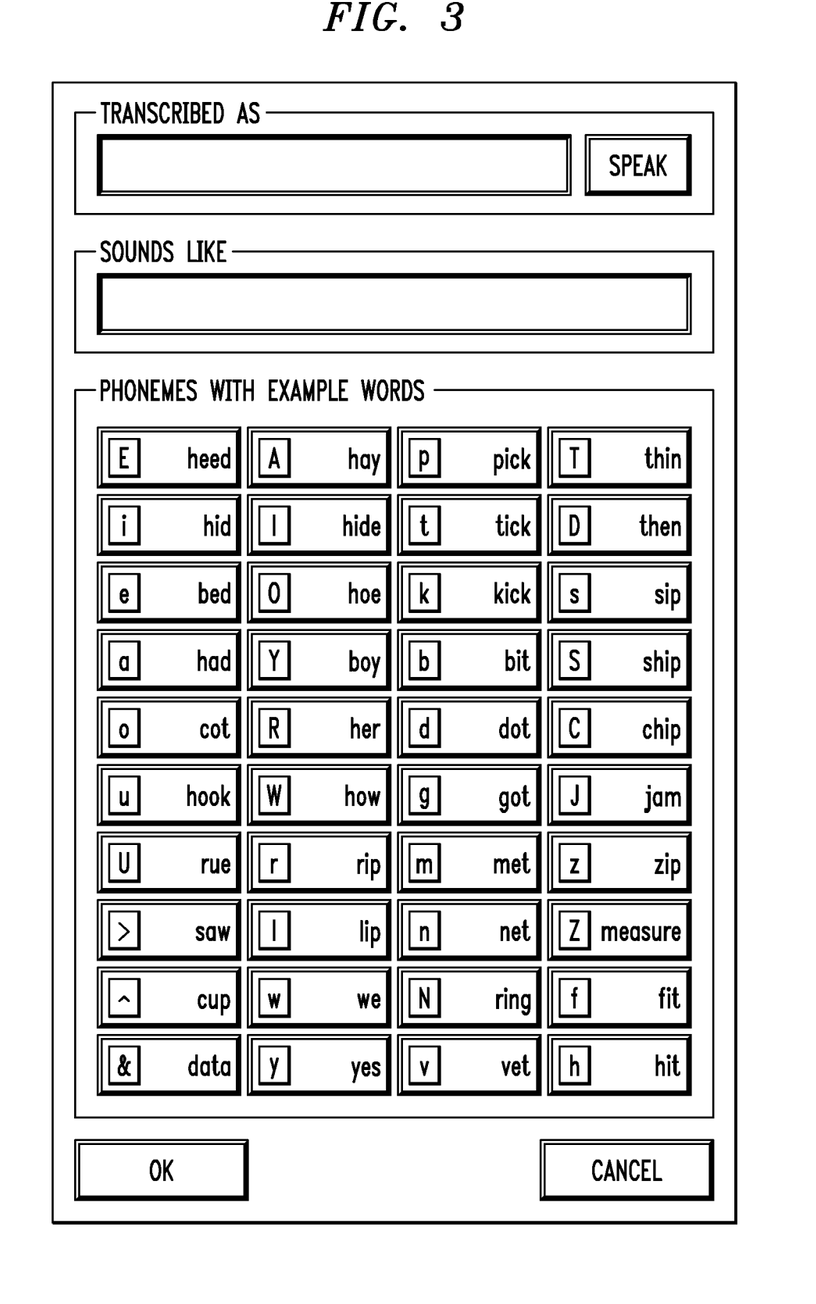
FIG. 3 shows a first embodiment of a name-creation template of the system of FIG. 1.
Figure 4:
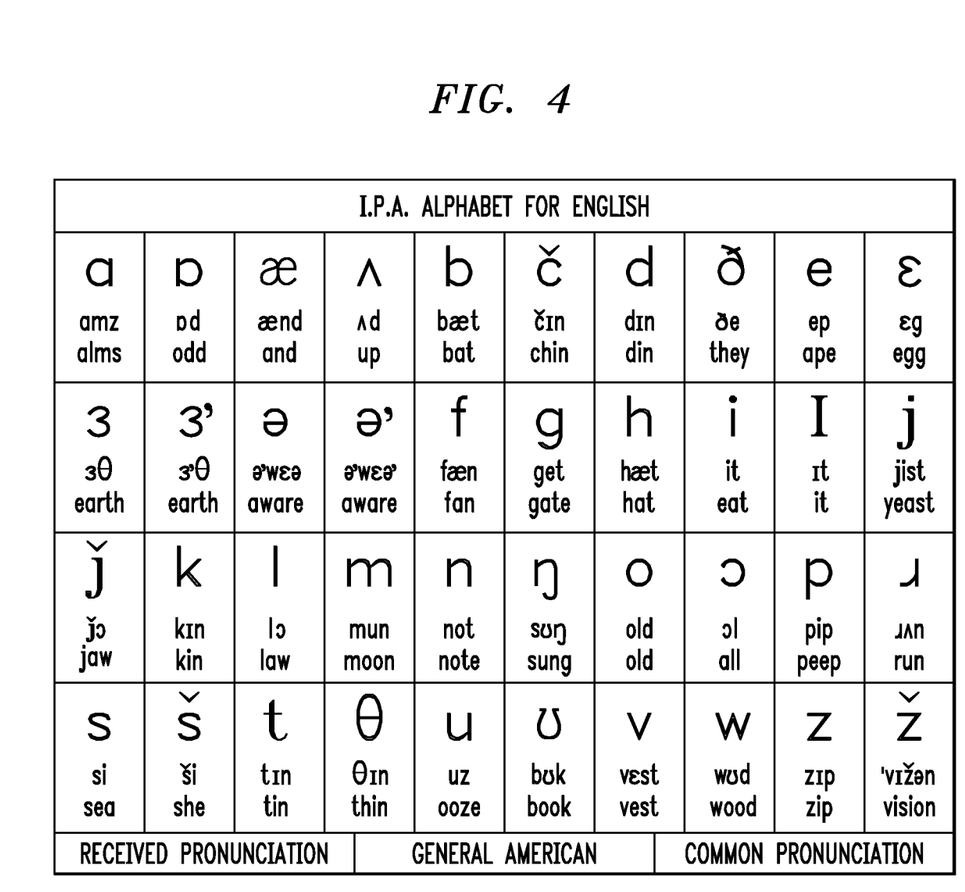
FIG. 4 shows a second embodiment of the name-creation template of the system of FIG. 1.

To create the phonetic-alphabet representation of the name, a user of computer 102 invokes a name-creation function, at step 200, and, in response, computer 102 displays a name-creation template on its display screen 116. Alternative forms of the name-creation template are shown in FIGS. 3 and 4. The template of FIG. 3 enables creation of a phonetic representation of the name in the U.S. phonetic alphabet, whereas the template of FIG. 4 enables creation of a phonetic representation of the name in the international phonetic alphabet. Each template includes a field 310 for entering and displaying the name in text form, a field 320 for entering and displaying the name in phonetic-alphabet form, and virtual keys 330 for entering phonetic-alphabet characters. The user enters the text form of the name into field 310 via a user interface 118 of computer 114, such as a keyboard (or, in the alternative embodiment, via the dialing keypad of communication device 102), at step 202. Next, a text-to-speech conversion engine of computer 114 (or of device 102 in the alternative embodiment) converts the text form of the name into a phonetic-alphabet representation of the name, in a conventional manner, at step 204, and displays that representation in field 320, at step 206. The text-to-speech conversion engine also speaks the name as represented in the phonetic-alphabet form via user interface 108 such as a speaker, at step 208. The user determines from the spoken form of the name whether or not is has been pronounced correctly, at step 210. If it has not been pronounced correctly, the user uses virtual keys 330 to modify the phonetic-alphabet representation of the name in field 310, at step 220. (In the alternative embodiment, the name-creation function converts the keypad keys to represent the letters of the phonetic-alphabet instead of letters of the normal (e.g., Latin, Roman) alphabet, and the user uses the keys of the keypad to modify field 310). The text-to-speech conversion engine then speaks the name as represented in the modified form, at step 208.

If and when the user is satisfied with the pronunciation of the name, at step 230, computer 114 (or device 112 in the alternative implementation) interacts with server 104 to store the name in the text form and in the phonetic-alphabet form on server 104 and/or device 102, at step 222. The use of the name represented in phonetic-alphabet form is illustrated in FIG. 5.

When the user of communication device 102 calls another party, e.g., a user of device 110, at step 500, the phonetic-alphabet representation of the name is conveyed to the called party as caller ID information along with the conventional text representation of the name, at step 502. Conversely, the phonetic alphabet representation of the called party is conveyed to the calling party in like manner. For example, if the Session Initiation Protocol (SIP) is used to set up the call, the phonetic-alphabet representation and the text representation of the name are both conveyed in the "From" or "Contact" header field of a SIP message, such as an "invite" message, separated from each other by a conventional SIP record separator symbol. Or, the text representation is conveyed in the "From" or "Contact" header field while the phonetic-alphabet representation is conveyed in the "P-Asserted-Identity" header field of the SIP message. Or, each representation may be conveyed by the same header field of different SIP messages, such as the "invite" and "update" messages. Alternatively, if the QSIG signaling protocol is used instead of SIP, the phonetic-alphabet representation may be conveyed in the "Name2" header field or the manufacturer specification interface (MSI) field of a QSIG message.

At the receiving party's communication terminal 110, both the text representation and the phonetic-alphabet representation of the calling party's name are displayed to the user of terminal 110 on display 112 of terminal 110, at step 506. If the alphabet of the native language of the receiving party is not the same as the alphabet of the native language of the sending party, the phonetic-alphabet representation of the name may be converted to the alphabet of the receiving party's native language, at step 504, and displayed to the receiving party in the converted form at step 506. For this purpose, server 104 has access to a language-to-script translation database 124. If multiple servers serve devices 102, 110, each server may share one copy of database 124, or each server may have its own copy of database 124. Database 124 correlates languages with writing scripts that are natively used to express (write) those languages, and each script correlates with one or more languages. Additionally, a text-to-speech engine of terminal 110 may speak the sending party's name as represented by the phonetic-alphabet representation, at step 508. Call set up then continues in conventional manner, at step 510.

Figure 5:
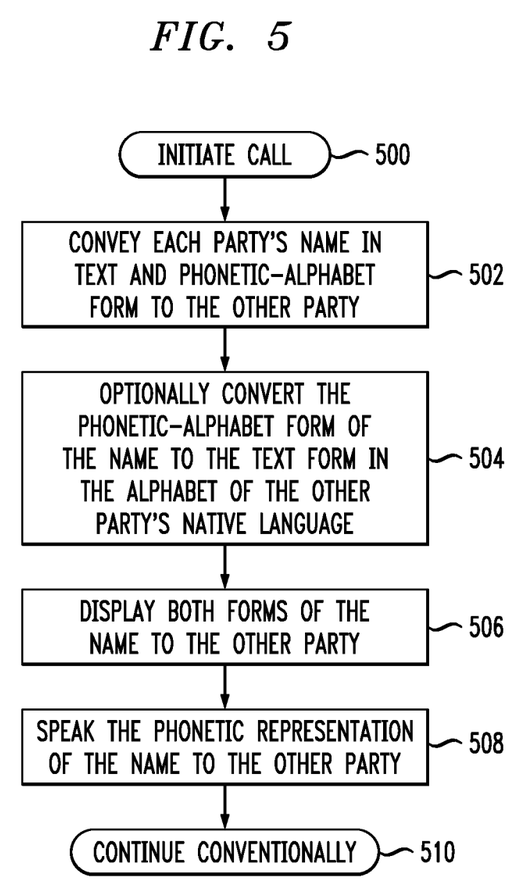
FIG. 5 is a flowchart of use of a name represented in a phonetic-alphabet form during set-up of a call in the system of FIG. 1.

Conversely, if a user of terminal 110 calls terminal 102, the text and the phonetic-alphabet representation of the name are conveyed and displayed and/or spoken to the user of terminal 110 as called-party ID information in FIG. 5.

Of course, various changes and modifications to the illustrative embodiment described above will be apparent to those skilled in the art. For example, the phonetic-alphabet representation of the name can also be included as a part of an email business card that has a "click-to-hear" correct pronunciation icon. Or, the phonetic-alphabet representation of the name may be accessed from a telephone via a feature-access code (FAC). Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   receiving text comprising information expressed in a non-phonetic-alphabet form from a first user;
   converting by a computer the non-phonetic-alphabet form into a phonetic-alphabet form;
   displaying the information in the phonetic-alphabet form;
   converting by the computer the information from the phonetic-alphabet form into speech;
   presenting an interface for editing the phonetic-alphabet form of the information to the first user;
   in response to the first user editing the phonetic-alphabet form of the information, displaying the information in the edited phonetic-alphabet form;
   further in response to the first user editing the phonetic-alphabet form of the information, converting by the computer the information from the edited phonetic-alphabet form into speech;
   setting up a call by the computer between the first user and a second party; and
   conveying by the computer the edited phonetic-alphabet form of the information to the second party during call set-up.

2. The method of claim 1 further comprising: repeating at least once the steps of displaying the information in the edited phonetic-alphabet form and converting by the computer the information from the edited phonetic-alphabet form into speech; and storing a last-edited said edited phonetic-alphabet form of the information.

3. The method of claim 1, wherein the information conveyed comprises a name of the first user, and wherein conveying comprises converting by the computer the name in the phonetic-alphabet form into speech to the second party.

4. The method of claim 1, wherein the text comprises a name of the first user.

5. The method of claim 1 wherein: the text comprises a name of the first user, and the method further comprises repeating at least once the steps of displaying the information in the edited phonetic-alphabet form and converting by the computer the information from the edited phonetic-alphabet form into speech, and using an edited said phonetic-alphabet form of the information in setting up a call between the user and another party.

6. The method of claim 1, further comprising: storing said edited phonetic-alphabet form of the information.

7. A method comprising:
   a processor receiving text comprising information expressed in a non-phonetic-alphabet form;
   the processor converting the non-phonetic-alphabet form into a phonetic-alphabet form;
   the processor displaying the information in the phonetic-alphabet form;

the processor converting the information from the phonetic-alphabet form into speech;

the processor presenting an interface for editing the phonetic-alphabet form of the information;

in response to a user editing the phonetic-alphabet form of the information, displaying the information in the edited phonetic-alphabet form; and further in response to the user editing the phonetic-alphabet form of the information, the processor converting the information from the edited phonetic-alphabet form into speech;

the processor storing the information expressed in a phonetic-alphabet form;

the processor setting up a call between a first party and a second party; and the processor conveying the information expressed in the phonetic-alphabet form from the first party to the second party during call set-up.

8. The method of claim 7, wherein the information comprises a name of the first party.

9. The method of claim 8 wherein: conveying comprises presenting the name to the second party.

10. The method of claim 9 wherein: presenting comprises displaying the name in the phonetic-alphabet form to the second party.

11. The method of claim 9 wherein: presenting comprises converting by computer the name in the phonetic-alphabet form into speech to the second party.

12. The method of claim 9 wherein: presenting comprises converting the information from the phonetic-alphabet form into an alphabet of a language of the second party; and displaying the name in the alphabet of the language of the second party to the second party.

13. The method of claim 7 wherein: setting up a call comprises setting up a call via signaling messages of a first communications protocol; and conveying comprises conveying the information expressed in the phonetic-alphabet form via a signaling message of the first communications protocol.

14. The method of claim 13 wherein: the communications protocol comprises a Session Initiation Protocol (SIP), and the information expressed in the phonetic-alphabet form is conveyed in at least one of a "From", "Contact" and a "P-Asserted-Identify" header field of a SIP message.

15. The method of claim 13 wherein: the communications protocol comprises QSIG, and the information expressed in the phonetic-alphabet form is conveyed in at least one of a "Name2" or a manufacturer specification interface (MSI) field of a QSIG message.

16. A computer-readable medium device containing instructions which, when executed by the computer, perform the method of one of claims 1-15.

17. An apparatus comprising:
a memory;
a processor in communication with the memory;
an interface in communication with the processor, the interface operable to:
  receive text comprising information expressed in a non-phonetic-alphabet form;
  receive edits to a phonetic-alphabet form of the information;
a display operable to:
  display the phonetic-alphabet form of the information;
  responsive to the phonetic-alphabet form being edited with the interface, display said edited phonetic-alphabet form of the information;
a text-to-speech engine executed by the processor, the text-to-speech engine operable to:
  convert the information expressed in the non-phonetic-alphabet form into the phonetic-alphabet form;
  convert the information from the phonetic-alphabet form into speech;
  responsive to the phonetic-alphabet form being edited with the interface, convert the information from the edited phonetic-alphabet form into speech;
  set up a call between a first party and a second party; and
  transmit the information expressed in the phonetic-alphabet form to the second party during call set-up.

18. The apparatus of claim 17 further comprising: storage operable to store the edited phonetic-alphabet form of the information.

19. The apparatus of claim 17 wherein: the information comprises a name of a party to a call.

20. An apparatus comprising:
means for receiving text comprising information expressed in a non-phonetic-alphabet form;
means for converting by a computer the non-phonetic-alphabet form into a phonetic-alphabet form;
means for displaying the information in the phonetic-alphabet form;
means for converting by the computer the information from the phonetic-alphabet form into speech;
means for presenting an interface for editing the phonetic-alphabet form of the information;
in response to a user editing the phonetic-alphabet form of the information, means for displaying the information in the edited phonetic-alphabet form;
further in response to the user editing the phonetic-alphabet form of the information, means for converting by the computer the information from the edited phonetic-alphabet form into speech;
means for storing information expressed in a phonetic-alphabet form;
means for setting up a call between a first party and a second party; and
means for transmitting the stored information expressed in the phonetic-alphabet form to the second party during call set-up.

21. The apparatus of claim 20 wherein: the information comprises a name of the first party.

22. An apparatus comprising:
means for receiving text comprising information expressed in a non-phonetic-alphabet form;
means for converting by a computer the non-phonetic-alphabet form into a phonetic-alphabet form;
means for displaying the information in the phonetic-alphabet form;
means for converting by the computer the information from the phonetic-alphabet form into speech;
means for presenting an interface for editing the phonetic-alphabet form of the information;
in response to a user editing the phonetic-alphabet form of the information, means for displaying the information in the edited phonetic-alphabet form;
further in response to the user editing the phonetic-alphabet form of the information, means for converting by the computer the information from the edited phonetic-alphabet form into speech;
means for setting up a call between a first party and a second party;
means for receiving information expressed in a phonetic-alphabet form from the first party; and
means for presenting the information expressed in the phonetic-alphabet form to the second party.

23. The apparatus of claim 22 wherein: the information comprises a name of the first party.

24. The apparatus of claim 22 wherein: the means for presenting comprises a display screen for displaying the phonetic-alphabet form of the information to the second party.

25. The apparatus of claim 22 wherein: the means for presenting comprises a text-to-speech conversion engine for converting the information from the phonetic-alphabet form into speech.

26. The apparatus of claim 22 wherein: the means for presenting comprises means for converting the information from the phonetic-alphabet form into a non-phonetic-alphabet of a language of the second party, and a display screen for displaying the non-phonetic-alphabet form of the information to the second party.

* * * * *